US008567176B2

(12) United States Patent
Skomsvold

(10) Patent No.: US 8,567,176 B2
(45) Date of Patent: Oct. 29, 2013

(54) ROTATING DEVICE

(75) Inventor: Age Jorgen Skomsvold, Tonsberg (NO)

(73) Assignee: Rotoboost AS, Tonsberg (NO)

( * ) Notice: Subject to any disclaimer, the term of this patent is extended or adjusted under 35 U.S.C. 154(b) by 1017 days.

(21) Appl. No.: 12/521,429

(22) PCT Filed: Dec. 27, 2007

(86) PCT No.: PCT/NO2007/000463
§ 371 (c)(1),
(2), (4) Date: Nov. 16, 2009

(87) PCT Pub. No.: WO2008/088225
PCT Pub. Date: Jul. 24, 2008

(65) Prior Publication Data
US 2010/0061838 A1 Mar. 11, 2010

(30) Foreign Application Priority Data
Dec. 28, 2006 (NO) .................................. 20066061

(51) Int. Cl.
*F02C 3/14* (2006.01)
(52) U.S. Cl.
USPC .................. 60/39.34; 60/39.01; 60/39.35
(58) Field of Classification Search
USPC .................. 60/39.34, 39.01, 39.35
See application file for complete search history.

(56) References Cited

U.S. PATENT DOCUMENTS

| 2,890,570 | A | * | 6/1959 | Castles, Jr. .................. 60/39.35 |
| 3,990,228 | A | | 11/1976 | Bailey et al. |
| 4,307,573 | A | | 12/1981 | King |
| 5,960,625 | A | | 10/1999 | Zdvorak, Sr. |

FOREIGN PATENT DOCUMENTS

| DE | 3306971 | 8/1984 |
| EP | 0073434 | 11/1986 |
| WO | 2005017332 | 2/2005 |
| WO | 2007058555 | 5/2007 |

OTHER PUBLICATIONS

International Searching Authority, "International Search Report for PCT/NO2007/000463", Jun. 3, 2008, Publisher: World Intellectual Property Organization, Published in: WO.
Norwegian Patent Office, "Norwegian Search Report for Application No. 20066061", Jul. 13, 2007, Published in: Norway.

* cited by examiner

*Primary Examiner* — Phutthiwat Wongwian
*Assistant Examiner* — Vikansha Dwivedi
(74) *Attorney, Agent, or Firm* — Blanchard & Associates

(57) ABSTRACT

A rotating device for producing pressure by expansion of a-pressurized process substance is provided. The rotating device includes a U-channel structure arranged to be rotatable around an axis of a shaft. The U-channel structure includes an expansion point arranged at a periphery of the rotating device, a sinking channel for delivery of the pressurized process substance to the expansion point, a rising channel for delivery of the expanded process substance from the expansion point to a regulating valve for a delivery of the expanded process substance under a higher pressure than that of the pressurized process substance through an outlet channel to an energy recovery device. The rotating device is connected to driving devices in order to rotate the U-channel structure around the axis of the shaft.

26 Claims, 6 Drawing Sheets

ROTATING DEVICE

FIELD OF THE INVENTION

The present invention relates to engine- and compression technique.

TECHNICAL BACKGROUND

It is a lot of engine- and compression techniques today that's built on pressure and expansion of air by combustion, to run an engine, turbo and turbine. Common for them is low thermal-efficiency, as compression before expansion is energy demanding. There is also many movable pads, and other parts which have to be assembled in current engines and compressors making them complex, expensive with a low wear ability and running-stop. To avoid this, frequently maintenance has to be done.

The gas turbine is one of the most energy economical, and safe running engines today. But it is still a lot of resistance and energy loss in the compression process and the engine is complex and expensive, besides it is not energy economical when partially loaded, and therefore it is less suitable for instance as car engines.

SUMMARY OF THE INVENTION

It is an object of the invention to provide a rotating device producing pressure by centrifugal pressurized fluid (liquid, gas or plasma) that afterwards is expanded, and including a U-channel structure that includes an expansion point at the periphery of the rotating device, and which includes a sink channel in said U-channel structure, and said sink channel is a pressure channel for supply of pressurized fluid to said expansion point, and which include a rise channel in said U-channel structure for transport of said expanded fluid from said expansion point, to an outlet channel for said pressurized fluid to a regulation valve for supplying said fluid of high pressure into an outlet channel for said pressurized fluid to an energy utilizations device, and drive means to rotate said U-channel structure, wherein said sink channel and rise channel is connected together at the periphery and arranged radial on the shaft in said device, and said U-channel structure is connected to the shaft in balance with two or more U-channel structures.

BRIEF DESCRIPTION OF THE DRAWINGS

The invention will now be described in detail in reference to the appended drawings, in which.

DETAILED DESCRIPTION

Figure 1:
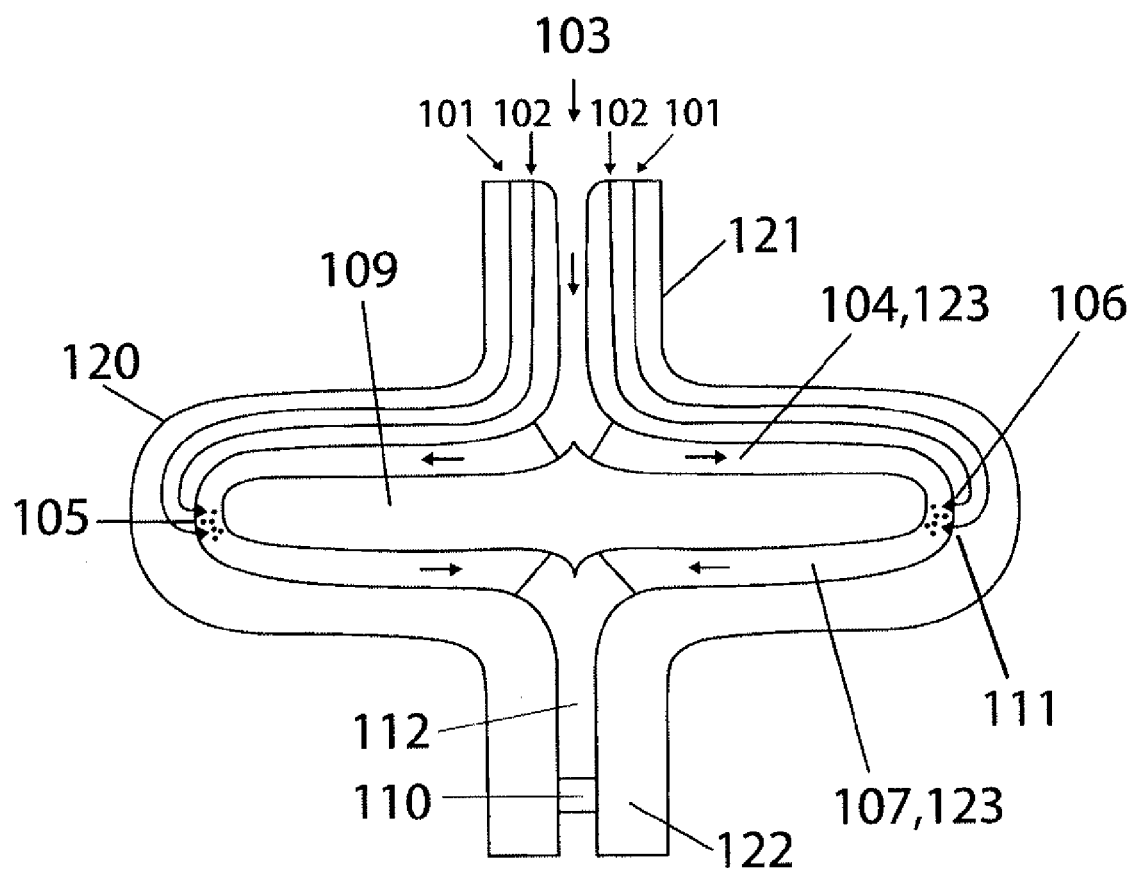
FIG. 1 is a longitudinal principle sketch through the first embodiment of the invention.

FIG. 1 shows the principal parts of the invention, namely a cylindrical drum or disc-like structure 120 with hollow shafts 121, 122. The shafts 121, 122 are suspended in bearings and connected with drive means arranged to rotate the disc 120 (not shown). The structure includes an inlet channel 103, in which fluid (example air) is supplied to compression and expansion. The inlet channel is placed in the centre of the shaft 121, and branches out in a sink channel 104. The fluid will be thrown outwards in the sink channel 104 due to centrifugal forces. The sink channel 104 may be realized as a flat disk-like chamber, possible with vanes, or as tubes or hollow spokes leading from the centre part of the disc to the periphery. In the embodiment shown in the figure, the vanes 123 will also act as support elements binding the structure together between the channel partition disk 109, and outer part of the U-channel structure 120 and shaft 121, 122. At the periphery, the pressurized fluid will get in contact with propellant nozzle 106 and spark plugs 111, respectively. The propellant nozzle 106 is supplying propellant in the propellant channel 102 from a drag chamber (not shown) arranged on the shaft 121. The spark plug get high-voltage trough electrical conductor 101 from a slip ring on the shaft 121 and trough the disc structure 120 which is earthed (not shown).

The propellant nozzle 106 and the spark plug 111 are located at the periphery in said U-channel, so that propellant from propellant nozzle 106 will be mixed together with fluid. The mixture will ignite in expansion point 105 of the spark from the spark plug 111, after the propellant nozzle 106. The spark will stop after ignition. The expanding fluid will be pressed by the heavier fluid from sink channel 104 further over to the rise channel 107, which may be a disc-like chamber with radial walls 123, or a plurality of tubes or hollow spokes, similar to the input-103 and sink channel 104. The rise channel 107 is connected to an output channel 112 in the centre of the shaft 122, and further to a regulation valve 110 which is adapted to regulate the fluid output at optimum pressure and mass. The regulation valve 110 can be closed 310a, or open 310b.

The present invention is a rotating device where it is arranged two or more U-like channels arranged radial 120, and in balance on the shaft 121, 122 with inlet-103 and outlet channel 112 in, or around the shafts 121, 122. During high rotation, the fluid (example air) will because of its mass be pressed by centrifugal forces out towards the periphery of said U-channel. There fluid from inlet channel 103 is branched out in several sink channels 104, and it is connected together with channels from periphery to outlet channel 112 with rise channel 107. At high rotation, the fluid will be pressurized by its mass towards periphery in sink channel 104. Then more fluid will flow into the sink channels 104 (when fluid are at compressible phase), and it will press the fluid further together. It will be a static-like high pressure of the fluid in the channels at periphery. In the invention, the pressure can be constant there in the process, when the rotation is constant. And at the beginning is the heavy-density in balance between sink channel 104 and rise channel 107, but when influence on the fluid to lower heavy-density and then lower weight by expansion (example by said combustion) from expansion point 105 in the fluid channel at periphery and up rise channel 107, some of the fluid will expand out through outlet channel 112. Then it will be unbalance between the fluid in sink channel 104 and rise channel 107 causing the heavier (example colder) fluid from sink channel 104 to be pressed at the periphery over to rise channel 107 and pressing the fluid there further to outlet channel 112. By the continuous influence to expand (example combustion) the fluid, when it continuous passes through the expansion point 105 at the periphery, it will form a continuous move towards outlet cannel 112. A pressure regulation valve (example adjustable stator blades) 310 in the outlet channel regulates the output pressure optimally, so that the fluid in said U-channel only moves itself towards the output channel. And due to the higher expansion (lower heavy-density) in rise channel 107, the higher pressure out of the invention device after the pressure regulation valve 110 and by doubling the volume in rise channel 107 compared with sink channel 104, the theoretical pressure out will be 50% of the pressure at periphery. By five times volume expansion, the pressure at the regulations valve in outlet will be 80% of the pressure for the fluid in the channel at the periphery and so on. The centers of gravity of the fluid in rise channels 107 will be nearer the shaft and the sum of the mass there will therefore experience a lower centrifugal force than the fluid in sink channels 104 where the centers of gravity are nearer the periphery, because of larger pressure difference from input to periphery (with compressible fluid), compared with rise channels 107 with less pressure difference between periphery and outlet channel, and therefore will said percent for pressure out be higher.

There are several methods to increase the density (reduce volume) of the mass in sink channel 104 and to reduce the density (increase volume) of the mass in rise channel 107, like for example:

For sink channel 104 to expanding point 105: n and/or before sink channel the fluid can be a liquid, or at gas phase and cooled for higher density, and/or the fluid can be pumped/pressurized to inlet channel 103.

For rise channel 107 from expanding point 105: The fluid can for instance be heated up within same phase, or over one or more phases, or be split for lower density with catalyzing and/or electrochemistry, or similar, or any combination of said examples.

THE ADVANTAGE OF THE INVENTION

The advantage of the invention is that pressure regulation 110 of the fluid output creates a higher pressure out 112 than in 103, in the device. The tangentially acceleration force on mass out towards periphery 104 will practically be returned by the tangentially retardation force of the same mass with transport from periphery, back to shaft in closed channels 107. When the rotating device is arranged inside a evacuated housing (not shown), it will be minimal rotary resistance, noise and heat loss. The device is compact, and with few movable parts, which give less frequently maintenance. In the device, the produced output pressure can be used to produce energy.

The pressure from the inventive device can be conducted via energy utilization devices such as: -turbo generator, -turbo loader, -turbine generator, -pressure motor, nozzle or injector for propulsion, or similar, or to accumulate the pressurized fluid.

Said connected energy utilization devices can be adjusted optimum for a flow-through-velocity, in such a way that regulation valve 110 for optimum pressure out is less necessary, and will therefore get a better energy economy.

Said energy utilization devices such as: -turbo generator, -turbo loader, -turbine generator, -pressure motor, can be installed external with connected channels for fluid from the invention device. Or arranged on the same shaft as the inventive device. Using for instance an axial turbine on the same shaft, the inventive device will be like a centrifugal compressor-gas turbine/jet motor which is less energy economical than the current inventive device. For instance is the compression more energy demanding, for the tangential acceleration force (in sink channel 104 for the invention) will not be returned by the tangentially retardation force (in rise channel 107 for the invention) of the fluid, as in the invention. In addition, a centrifugal compressor-gas turbine will have much more friction tangentially. This will nearly not occur in the present invention, where the fluid practically have only friction axial and radial, which is relative low when the fluid move by itself in the closed channels 103, 104, 107, 112 in the rotating device, and the outside of the channels rotates in vacuum. The fluid have relatively much higher periphery velocity then the flow through velocity in the channels, and when the fluid only are in contact with the channel walls, which on the outside are in vacuum, and with that the current rotating device can have a very high and constant rotation, without worth mentioning rotation resistance, and at same density on the fluid in sink channel 104 and rise channel 107, said fluid will not move in the channels, but when expansion in rise channel 107, it will immediately move when during rotation and form a pressure out as said earlier for the present invention.

Figure 2:
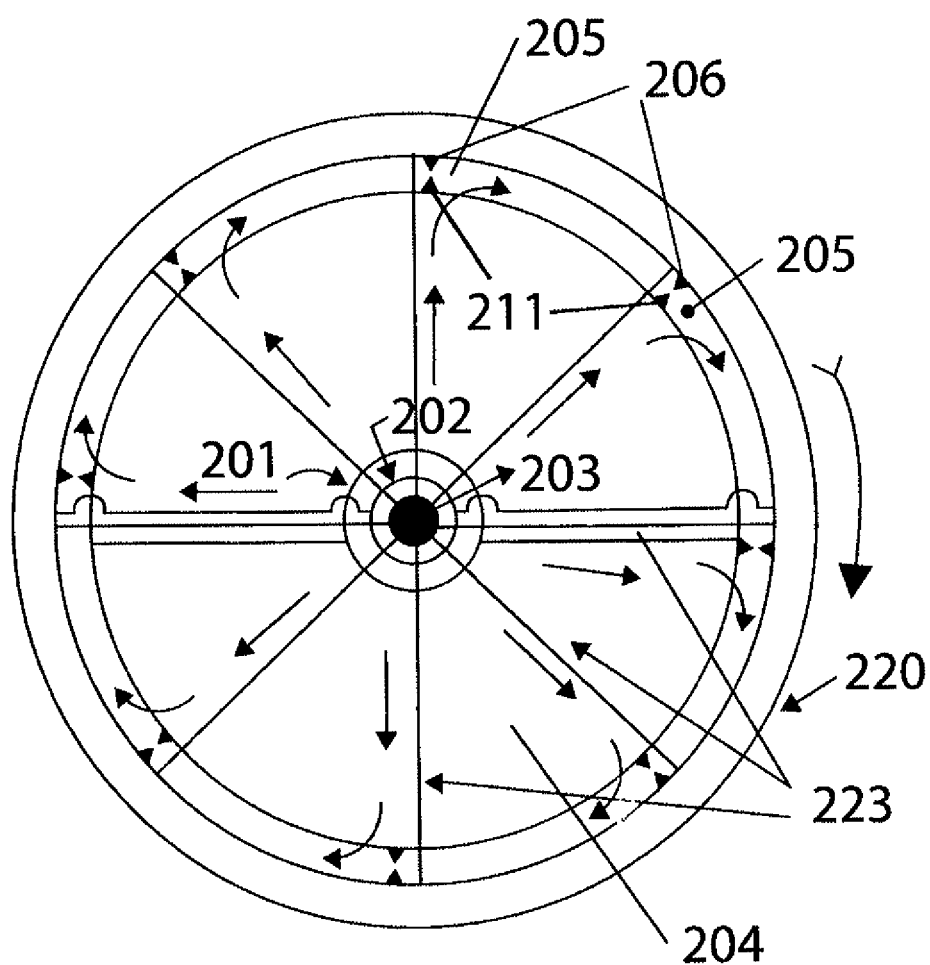
FIG. 2 is a cross section of inlet side in sink channel through the embodiment shown in FIG. 1.

FIG. 2 is a cross section through the U-channel structure 220 shown in FIG. 1, in area of propellant nozzle 206 and spark plug 211. The fluid move into the device through inlet channel 203 in centre and is forced to out towards to the periphery, and tangentially accelerates along the shovel 223. But the radial velocity can be constant when the fluid is pressurized in sink channel 204 where it get in contact with the propellant nozzle 206 which added in proper quantity propellant. The spark plug 211 form a spark between the propellant nozzle 206 that start expansion of the fluid in expanding point 205, and then it will move first tangentially in the rotation direction, before it will be pressed further axially in to the periphery of rise channel 207. The figure also shows propellant channel 202, and the insulated conductor 201 for high voltage to spark plug 211.

Figure 3:
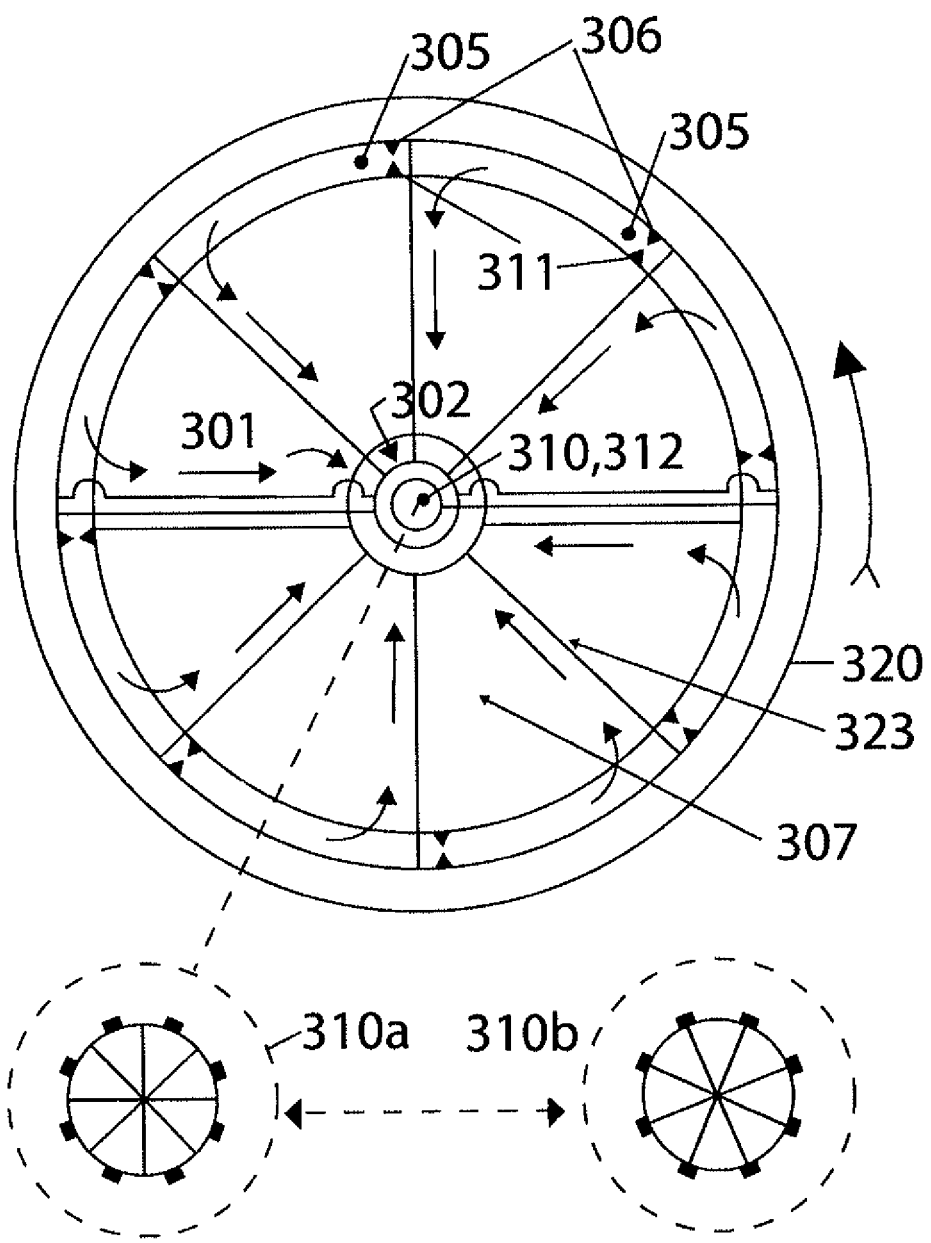
FIG. 3 is a cross section of outlet side in rise channel through the embodiment shown in FIG. 1.

FIG. 3 is a cross section through the U-channel structure 320 shown in FIG. 1, in the area of propellant nozzle 306 and spark plug 311. The fluid will get in contact with the propellant nozzle 306 that add in proper quantity propellant. Then, the spark plug 311 form a spark between the propellant nozzle 306 which start expansion of the fluid in expansion point 305, whereupon it will moves first tangentially in the rotation direction, before it will be pressed further axially in the periphery and then up along the shovels 323 and then tangential retards in rise channel 307, and the radial velocity can be constant, and the fluid will be pressed further out in outlet channel 312 to regulation valve 310 which can be regulated between closed 3100 or open 310b. The figure also show propellant channel 302, and insulated conductor 301 for high voltage to spark plug 311.

However, if the structure must be run at a lower temperature, for example because of the material at high rotation does not tolerate high temperature to expand the fluid, the energy supply can then be reduced' and/or the heat can then be reduced on the U-channel structure with heat exchange channels which surround said fluid channels from inlet to outlet by supplying such as water or steam or other suitable cooling medium in said heat exchange channels in inlet, in proper quantity and pressure. Said heat exchange channels can be fitted with several longitudinal walls which are fastening to the outer side of the fluid channel and to the inner side of the heat exchange channels, both for better heat exchange and to strengthen the structure. The walls can be perforated with several adapted small holes, or fewer larger holes, which each have a sharp edge in the direction to the centre of the hole, to get less resistance. The holes are in equal distance both for lightening the weight and to equalize the pressure of the cooling medium between the walls. In the same way, it can be arranged corresponding longitudinal walls in the fluids sink channel, so the cooling medium can cool down the fluid there, for further compression of it, when it is compressible. The cooling medium, which can be water, will thereby be endothermic first from the compressed fluid and afterward from the energy supplied by the heat exchange from the expansion of the fluid. The heat exchanging changes the cooling medium up its rise channel to be over heated dry steam, which can be water steam, that have essential lower density then the water in heat exchanges sink channels, and a corresponding output pressure effect is achieved also in the heat exchange U-channel structure, like for the fluid channels U-channel structure.

Figure 4:
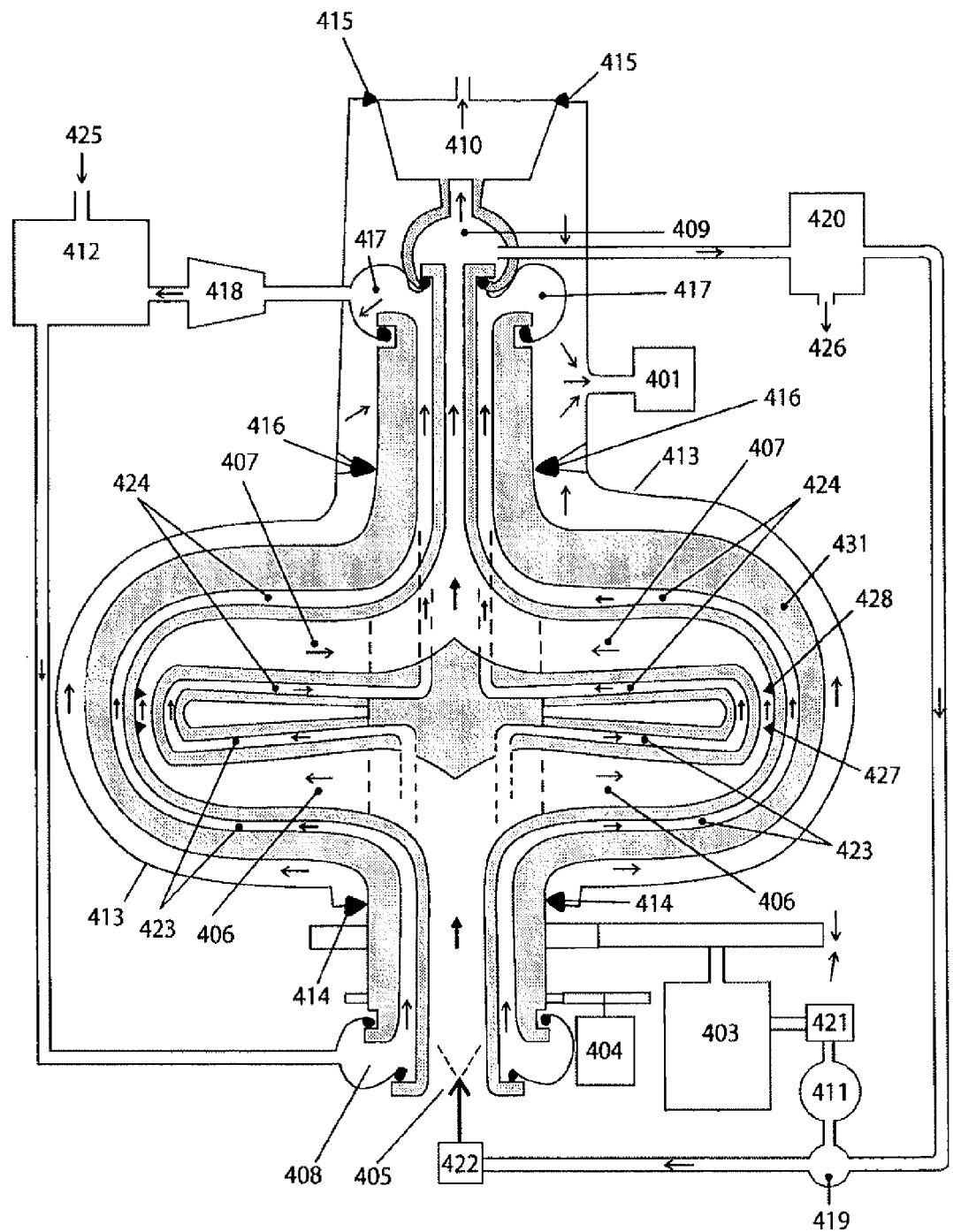
FIG. 4 is a longitudinal principle sketch through another embodiment of the invention, with an example of connections to existing energy utilizations devices.

FIG. 4 shows a principle sketch of another embodiment of the invention, in which four pipes form said U-channel structure 431, and which is fastened radially and in balance towards the shaft which belongs to inlet-405 and outlet channel 409. The fluid channels is; Inlet channel 405, sink channel 406, rise channel 407, and outlet channel 409 and they are surrounded by heat exchange channels; inlet channel 408, sink channel 423, rise channel 424 and outlet channel 417.

The rotating pressure production unit is encapsulated and fitted in an anchored evacuated housing 413 with bearings and gaskets 414 around the inlet shaft, and only a bearing with inner gasket at outlet shaft 416 with possibility for a flow through round bearing house 416. The evacuated housing is further fitted and tightened around the end of the turbine house 415 which does not rotate, and a vacuum is established inside the housing 413 by the vacuum pump 401. The rotating unit starts the rotation with help from a pressure start motor 403 which receives supplied fluid (for instance air) from an accumulator tank 411 via its regulations valve 421. By regulation of pressure fluid to the pressure start motor 403, its drive wheel will be pushed in contact with the shaft in the invention. When the rotating speed has been established, the valve 421 will close and the start motor's drive wheel will retract and out of contact with drive wheel on the shaft, and a rotation maintenances motor 404 take over for constant rotation.

At the start of rotation, some water w01 be pumped in to heat exchange cannel 408, such as the water level will be in proper distance from periphery in its sink channel 423 and rise channel 424. At the same time the valve 419 will open for supply from accumulating tank 411 pressurized fluid to injector 422 which is fitted to pull with more fluid from the ambient (air), or from a channel to supply other fluid (not shown) and in to inlet channel 405. Then the cooled fluid will be pressed to the sink channels 406 where the heavy density from the fluid will pressurized further by the centrifugal force through the periphery where its maximum pressurized, and where the fluid also gets in contact with the propellant nozzle 427 where an adapted amount propellant mixing together with the fluid, to be conducted further to the spark plug 428 (supply channel for propellant and the same for insulated conductor for high voltage to spark plug, is not shown, but can be as in FIG. 1) which ignite the propellant, so it will expand at constant pressure further over at periphery and up rise channel 407, and out channel in shaft to fluid slip chamber 409 which not rotate, and is connect with channel to turbine 410. From slip chamber 409 the expanded fluid can go in two directions. One of them is to turbine 410, which inside can have regulated stator blades similar to 310 in FIG. 3, or similar which in the start is closed, in such a way that the fluid will be conducted in other direction for recycle channel from slip chamber 409 to an heat exchanger and condenser 420, where moisture in the fluid separates out 426, so dry and cdd fluid further will be pressed via regulation valve 419 which is accommodated for passage of is accumulated fluid from accumulator tank 421. The recycled fluid will be pressed further in accommodated amount to injector 422 which will pull more and new fluid into inlet. In this way, the pressure will build up in the device, and by accommodated pressure valve 419 to accumulation tank will be closed, when it is loaded up, causing new and partly recycled fluid to be conducted directly to injector 422. Simultaneously, the regulated stator blades at turbine 410 will be opened, where some of the pressurized fluid can be energy utilized further, and the rest of the fluid recycle back in a proper amount to injector 422 to keep up the pressure in fluid to turbine 410, or similar energy utilized device as said.

At the same time, the water in heat exchange channels sink channel 423 will be heated up from pressurized fluid in its sink channel 406 when fluid is at compressible phase, and the fluid will then also become thermally compressed, and then be compressed further of the centrifugal force, and the water will at periphery in its heat exchange channel 424 cool down the wall to rice channel 407 where the fluid expand during combustion, and then will the cool medium/water change to steam, and nearer shaft and out channel in shaft to slip chamber 417 and further till after steam turbine 418 will the steam be dry, before it condensing in the low pressure condenser 412 where the condenser can be supplied with more water 425 and/or the water is pumped (not shown) back to the heat exchange channels slip chamber 408, and to a new cooling round.

The heating up of the cooling medium/water from the fluid in the U-channel structure, will at proper regulation out, the expanded steam press the water level out towards to the periphery at heat exchange rise channel 424 so that the water level get out to the periphery, but it is more favorable that the water level is higher up in heat exchange rise channel 424. Something that can be carried out by increase the pump pressure to inlet channel 408, or increase the rotation speed, or supply more water to increase the water level in heat exchange sink channel 423 when the water level from earlier is low there. And it is a valve at inlet (not shown) in the device which is accommodated to get out gas, when the sink channel is filled more up, and this is for all inlet channels when the medium is at liquid phase. At inlet to all channels in the rotation device can it be nearly vacuum, with an accommodated pressure at outlet for each cannel in the device and the pressure at periphery is more than twice as much as the pressure at inlet.

It is also possible to install a turbo charger (not shown) between slip chamber 409 and heat exchanger 420 and/or between steam slip chamber 417 and steam turbine 418 where pressurized fluid/steam in the turbo charger compressing new fluid which can be conducted via heat exchanger and condenser 420 where moisture in new fluid is separated out 426, before dry and cold new fluid is pressed further either direct to inlet channel 405 trough a own slip chamber (not shown) or similar, or to injector nozzle 422. Similarly it can be connected a fluid turbine charger/compressor on either axial turbine 410, steam turbine 418, or it can be connect to and from shafts inlet 405 then the last-said will be like a gas turbine, where the inventive device will be between the axial compressor and expanding turbine. The combustion chamber and expansion chamber will then be similarly as rise channel 407.

Energy utilizations turbines 410, 418 can be installed on the same outlet shaft (not shown) in the inventive device, with separated supply channels, and/or it can be a high pressure steam turbine on the shaft, and the steam after it can be leaded in a channel back by the rise channel {not shown) for after heating, Which can be in an own U-channel structure, which again increase both pressure and temperature, before the steam is leaded out 417 to an low pressure turbine which can be like 418 on FIG. 4 and further to a condenser 412.

By adjusting to equally pressure between the fluid in rise channel 407 and steam in heat exchanger channel 424 is it with that possible to couple rise channel 407 and heat exchange channel 424 together to one common rise channel (not shown), from a adapted point between periphery and shaft. Then will steam and fluid mixed together be leaded out in a common outlet channel (not shown) to a common turbine similar to 418 ore fastened on shaft and/or direct to nozzle (s) for propelling. Or the water condenser out after turbine and cleans before it recycles back to the invention. Where the said rise channels are coupled together to one common channel, can the substances from the rise channels be leaded first in to a common circular-shaped channel a round shaft, where the rise channels with different substances are connected at the periphery of the circular-shaped channel which the common channels out are connected at inner side of the circular-shaped channel towards the shaft and out.

By supply of hydrocarbons (not shown) together with water/steam in rise cool channel 424 at proper amount, for instance 2 kg water/steam or more per 1 kg hydrocarbons, where water and hydrocarbons up in heat exchange rise channel 424 will indirectly be heated up and in addition directly by thermal beams, when the channel wall between is of a material which tolerate thermal beams to pass through. Then will the water/hydrocarbons convert into hydrocarbon-water-steam from the heat of the fluid in rise channel 407, and in the heat exchange channel 424 will the most of the hydrocarbon-water-steam be split to hydrogen and CO by proper heating, and to pull out more hydrogen from the substance and as to convert CO to CO2 can it in the heat exchange channel 424 from a propitious point be fastened chrome-iron-oxide-catalyzers and/or nickel catalyzers (not shown) and in its outlet channel in shaft and inside in slip chamber 417 and channel to turbine 418 and the first stator blade an rotor blade there, can also be of said catalyzers or covered by nickel/chrome-iron-oxide, or alloy with this. Further in steam turbine 418 from a propitious point can stator blade and rotor blade be of, or covered with zinc, and from propitious point the rest inside the turbine and out can be of, or covered with copper, inside the turbine housing can it be placed said catalyzers at the same place. In this way it can with propitious temperature and pressure, formed a steam reforming system, which also catalyzing out hydrogen from the hydrocarbon-water-steam when it pressed out through said channels and turbine (s), and the gases condensates out and separates in the condenser 412. The hydrocarbon-water-steam can also after outlet 417 pass through several propitious catalyzers chamber (not shown) in said order, where they inside are filled with said catalyzers with most possible surface area, and between the catalyzers chamber it is coupled turbines which adjusting the adiabatic temperature and pressure for optimum catalyzing. With said catalyzers chamber it is less need for said catalyzers in channels 424, 417 and turbines 418. With supplied more water than necessary in the hydrogen production process, will said water after the steam process and steam turbine 418 be condensed back to water in condenser 412, or the water can condensate out in a condense chamber for water/steam between high pressure turbine and low pressure turbine. And if CO2 is influenced within critical temperature and pressure, can also CO2 be separated out on the same way in/or after the water condenser and possibly turbine. As a result, will practically clean hydrogen be leaded out, either via a turbine, where it at front edge can cool down the hydrogen, or the hydrogen leads direct to accumulation (not shown). Some of the produced hydrogen can be propellant for said fluid to expanding, and it will give a cleaner combustion which also produces water/steam. Or said steam reforming system is connected to one or more of said clean motor-/compressor units (not shown).

From above where an common rise channel (not shown) is said for fluid/steam, can this also be done for said steam reforming, but then the fluid in inlet 405 should be clean oxygen or mixed with other gas at adapted amount, density and pressure in proportionality to combustion of propellant for heating of said mix of water-hydrocarbon in heat exchange channel 424.

Figure 5:
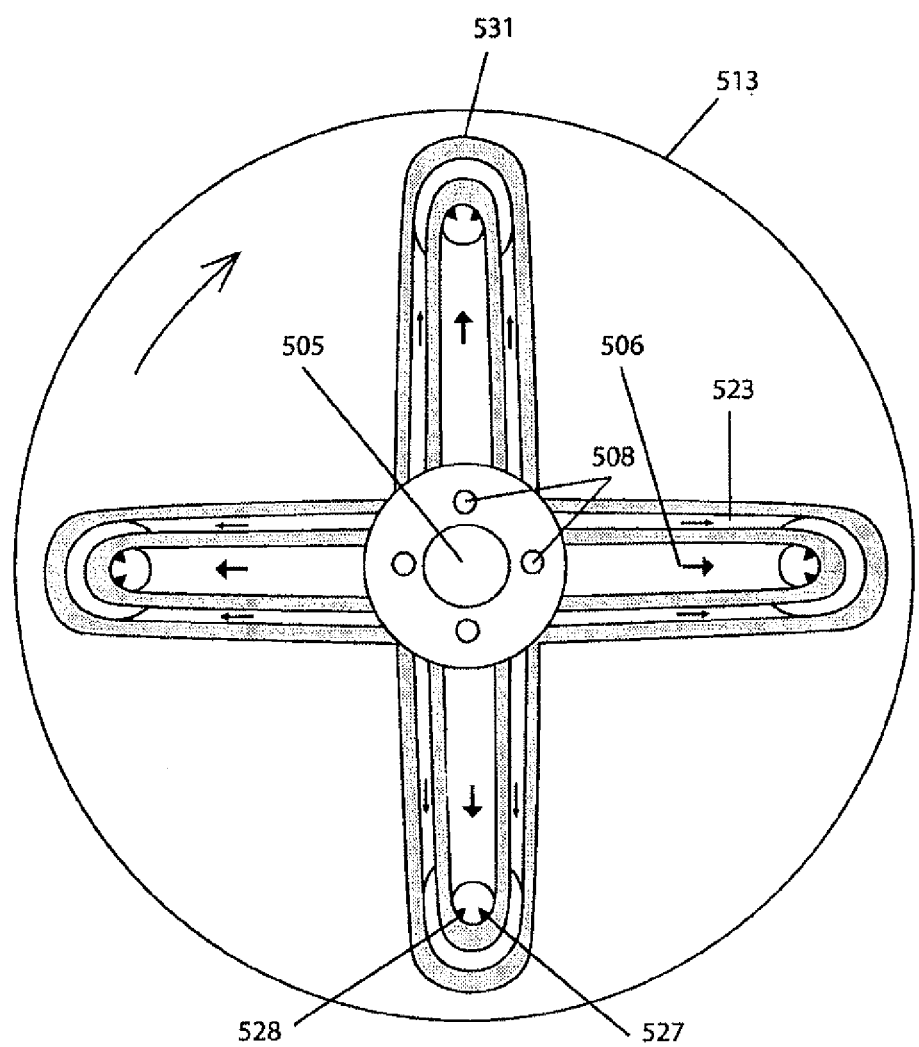
FIG. 5 is a cross section of inlet side in sink channel through the embodiment shown in FIG. 4.

FIG. 5 show a cross section through the U-channel structure 531 shown in FIG. 4, in area of propellant nozzle 527 and spark plug 528. The fluid move in to the device through inlet channel 505 in centre and are forced out towards to the periphery, and tangentially accelerates, but the radial velocity in the pipe can be constant when the fluid will be pressurized in sink channel 506 where it get in contact with the propellant nozzle 527 who added in proper quantity propellant, and the spark plug 528 form a spark between the propellant nozzle 527 which start expansion of the fluid, and then it will move first tangentially in the rotation direction, before it will be pressed further axially at the periphery into rise channel. The figure do not show propellant channel and insulated conductor for high voltage, but it can be like as in FIG. 2 but they only will be 15 leaded out into each U-channel structure 531. Heat exchange inlet channel 508 for water leads further to heat exchange sink channel 523 which surround the fluids sink channel 506

Figure 6:
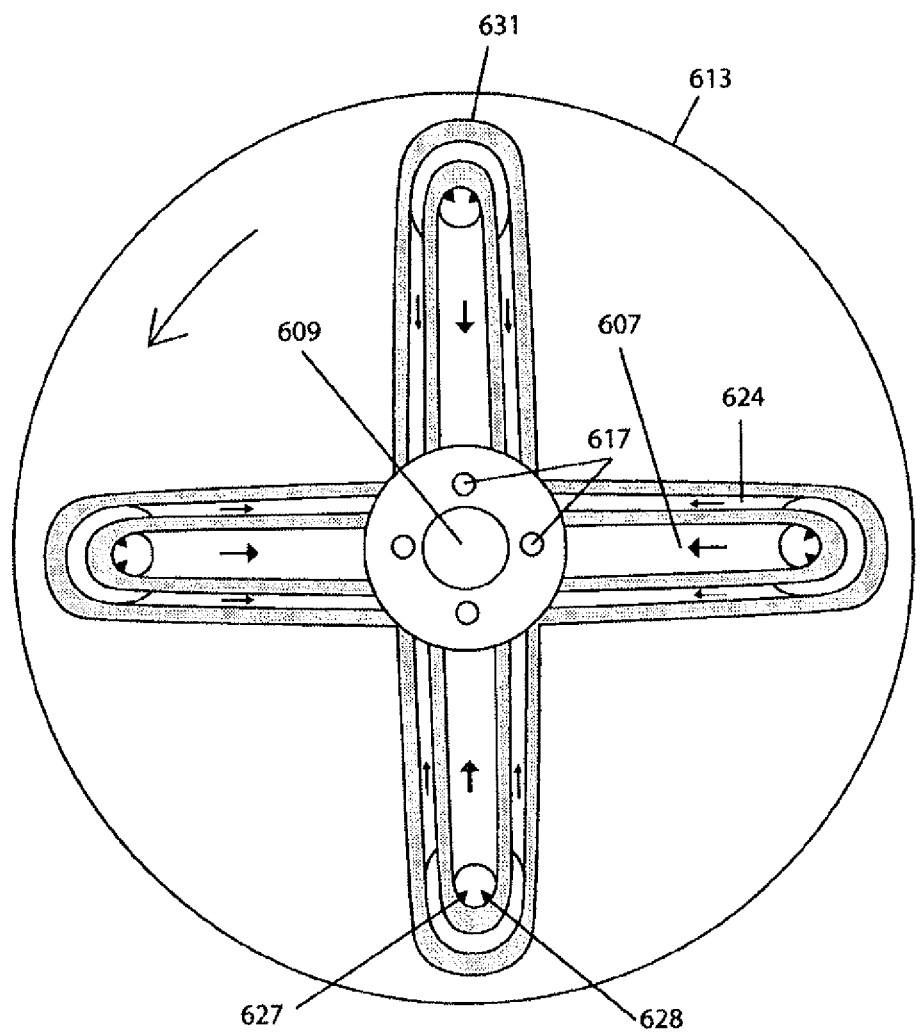
FIG. 6 is a cross section of outlet side in rise channel through the embodiment shown in FIG. 4.

FIG. 6 show a cross section through the U-channel structure 631 shown in FIG. 4, in the area of propellant nozzle 627 and spark plug 628. The fluid will get in contact with the propellant nozzle 627 who added in proper quantity propellant, and the spark plug 628 form a spark between the propellant nozzle 627 which start expansion of the fluid, which will move first tangentially in the rotation direction, before it will be pressed further axially in the periphery and then up into rise channel 607 and then tangential retards, and the radial velocity can be constant such as the sink channel. The fluid will be pressed further out in outlet channel 609 to regulation valve (not shown) which can be like 310 from FIG. 3, which can be regulated between closed 310*a* or open 310*b*.

Whilst the embodiment of the invention shown in FIG. 4 have the U-channel structure two channels (heat exchange- and fluid channels), can the U-channel structure be fitted with more channels for supply in/out with various substances The U-channel structures in the figures is shown in axially direction, but they can be placed in any kind of direction on the shaft from 0° as shown in the figures, and up to 180°, and in the area of last said degrees, will fluid from inlet to outlet pass through like in a loop via the U-channel structure. The U-channel structures may also be placed in area 90° one way on the shaft such as the fluid at the periphery moves in the channels there in the rotation direction, and when they is placed 180° of this, will the fluid at periphery move opposite of the rotation 40 direction.

The U-channel structure from FIGS. 1, 2 and 3 with disk-like structure, can be combined at periphery (not shown) where the U-channel structure is prolonged radial by pipes in combination with FIGS. 4, 5 and 6. Where the respectively channels is connect together for higher rotation and capacity. In the same way can the U-channel structure be as shown in FIGS. 4, 5 and 6, or the U-channels to disc-structure 120 connected at periphery with more conic-formed pipes, which is placed into each other, in an outer conic pipe, which is tightened at the end on the tip out at periphery. The interval inside between the pipes and channel in the innermost pipe is connected to theirs respectively in-/out channels by the periphery at the disk structure, and with two conic pipe including the outmost, where outmost as said are closed at periphery, and the innermost pipe are open at periphery. Then the innermost pipe channel can be either sink channel 104 or rise channel 107, and the interval between the pipes must then be the opposite of what the innermost channel is. And the innermost pipe must at periphery be placed/mounted on the inner side wall of the outer most pipe in rotation direction side, when the innermost pipe is rise channel 107, because when the fluid is rise from periphery after expansion, it will try to keep its periphery velocity, so the fluid with that will try to moves tangentially in the rotation direction. When the innermost pipe is sink channel 104, it then have to be placed/mounted on the inner side wall of the outer most pipe towards rotation direction side, accordingly opposite of, as said, for rise channel. The opening in the end of the innermost, pipe at periphery, may be formed as a half-moon structure, where the outer convex is placed/mounted at the concave inside to the outermost pipe. Instead of the innermost pipe it may also be putted in at same length a partition wall, which is mounted and tightened towards inside of the pipe in a axial direction, where the sink channel 104 is at the back side of said plate/wall in the rotation direction, and the rise channel 107 is on the opposite side of said plate/wall, and the channels is connected to disk-structure to theirs channels. Such can it be formed more U-channel structures along the periphery at the disk-structure, so that the conic pipes, or with a plate in the middle form a U-channel angle between the shafts in about 900. Said conics pipes and plate can in the construction include heat exchange channels, which is connected at periphery to form a U-channel, which further is connected at periphery at the disk-structures sink-/rise heat exchange channel for in-/out supply of cooling medium. Propellant nozzle 106 and spark plug 111 can be connected to at the periphery of the conic pipes as in FIG. 1.

It is propitious if the U-channels is completely or partly in radial length, is bended backwards in the rotation direction, for to utilize the resultant force between the centrifugal force and tangential force which increase the pressure at the periphery. It will simultaneous also lighten the fluid/medium up rise channel, since the resultant force from the tangential retardations force and the centrifugal force will act more towards the rise channel wall, than longitudinally the channel as the fluid/medium will be pressed upward in its rise channels.

At expanding point 105 and in periphery of sink channel, can it be arranged a combustion chamber (not shown) which can include least one propellant nozzle 106 and least one spark plug 111 at periphery of the said chamber. When the present invention is like disk-structure 120, can the combusting chamber lie/mounted along the periphery with same radius from shaft through all U-channels for fluid by the passage to periphery of rise channels 107 with same axially distance on the present circular combustion chamber channel, which at tangentially cross section can look like a U- or V-profile, where the tip lie radial outwards, and straight above periphery of rise channel 107. The combustion chamber channel is at the outside fastened to the shovels 123 and with a passage channel in them, and in addition it is from the top (towards shaft) of the combustion chamber channel, is it mounted on the outer side several radial plates, similar to the shovels 123 which they also are axially parallels with. Between the inner walls on the rise channels 107 and outer wall on combustion chamber channel is it now passage for some of the fluid, which indirectly will heat exchange and reduce temperature on combustion chamber channel, and the other structure in the area. The rest of the fluid leads in to combustion chamber channel through a lot of fitted hole distributed proportionally in the combustion chamber channel wall, to cool it down, and for supply of optimum amount fluid (for instance air) to combustions the propellant which expand with the fluid, and when it is radial upstream it will move tangentially in the combustion chamber channel (will try to keep periphery velocity) before the combusting fluid afterwards will mix together with the rest of the fluid, and pressed afterwards up rise channel 107 and out. The pressure before the combustion chamber channel can be fitted such that it will be in completely or partly buoyant balance, so that it will float on flow trough of the fluid, that will give less possibility for deformation, especially at high temperature in the combustion chamber channel. Then the flow through will be at its maximum.

The spark plug 111 is so far explained that it is at the periphery of the U-channel structures, but least one or more can instead be placed at a propitious place between where the spark plug 111 is shown at the figure and outlet 112. When spark plug is placed in said area, and the inventive device actuate for rotation, simultaneous as propellant is supplied to fluid from the propellant nozzle 106 at periphery, and fluid simultaneous pressed in to inlet 103. Then will fluid mixed with propellant moves to outlet 112, there the mix will be ignited by the spark plug 106 in said aria, whereupon regulation valve 110 regulates the outflow of fluid in such a way that the fluid mix between nozzle 106 and outlet 110 do not move faster than the flame velocity to propellant, like this can the flame get down to expanding point 105 at periphery, or to said combustion chamber channel, where the flame will be kept, however if flow through increase.

Propellant can also be combusted by spontaneous combustion, if compressions temperature is higher than the flame point for the propellant when the fluid is gas. If compression temperature for spontaneous combustion is not attainable at normal running, can the propellant be ignited by a adjusted shock pressure of fluid at inlet to achieve necessary spontaneous combustion at expanding point 105, and the flame maintenance afterwards in said combustion chamber channel, where the flame will be kept. It will then be less necessary with spark plug, which can be omitted. Regulations valve 110 at outlet can temporary be completely or partly closed when said shock pressure runs.

Propellant nozzles 106 is so far explained placed at periphery of the U-channel structure, but least one or more can instead be placed at a propitious place between point as explained 106 and inlet 103. By placing of the propellant nozzle(s) 106 in this area, must the flow through velocity for the fluid mixed with is propellant, always be higher than the flame velocity with passing through expanding point 105 or said combustion chamber. At said spontaneous ignition from the compression heat, must the compression heat to achieve this be as near the periphery as possible, and the flow through in ignition area must be higher than the flame velocity, for to bring the expansions over to rise channel 107, where the flow trough velocity can be lower and/or the fluid mix will be influenced to turbulence at for example said combustion chamber. Or the combustion ends in said combustion chamber as said for chock pressure when the compressions heat is lower than spontaneous ignition temperature at normal running.

Least 2 sink channels 104 and in balance, can it inside also be fluid mixed with adapted amount propellant which leads directly through channel to the bottom (periphery) and into combustion chamber, where the supply channel can be bended forward in rotation direction at bottom of combustion chamber, in such a way that the fluid mix will be given a tangential direction in rotation of the device in combustion chamber channel for better mixing with the other fluid.

All U-channels for fluid, cool medium or U-channels for other substances, may have one or more adapted outlet channels which is coupled with nozzles at periphery (not shown), where slag substances and some of the fluid, medium or other substances from the respectively U-channels leads via nozzles out at periphery and over to an adapted common spiral diffuser, which is fitted to the evacuated housing which not rotates, or one spiral diffuser for each U-channel and its fluid, medium, other substances and slag substances. At said outlet at periphery can it also be mounted valves which regulate the outlet when needed. In sink channels where the fluid may be at gas phase can it in inlet or through nozzles at propitious place in the sink channels, where its needed, or continuous be supplied a adapted liquid-fluid (for instance water) with adapted amount, it will then be a dual-purpose of thermal compression in the gases and also clean the gas channels at periphery outside of combustion chamber, When the said liquid-fluid (e.g. water) partly will evaporate, and the mix of liquid-fluid-slag-substances is transported to the nozzles along the periphery and out to spiral difusor. Said liquid-fluid can also cool down the inventive device for maintenance of the strength.

Said outlet nozzles at periphery can be arranged in such a way that they gives push force in the rotation direction. In such a way that they can completely-, or with a participations to give rotation velocity. In said spiral difusor, must the substances from the nozzles be thrown outwards in the spiral, this dependent on the resultant direction between periphery velocity and the out blowing velocity and direction for the substances, which determines if the spiral have to be mounted opposite of-, or in the rotation direction. Said spiral diffusers can be adapted for injector effect, which will form a under pressure inside the evacuated housing.

The present invention is so far explained with two shafts ends 121, 122. With inlet-103 and outlet channels 112 either inside or round the shafts ends. But the inlet shaft 121 can removes (not shown) so the inlet area 103 can be larger, and The U-channel structure 120 are then fastened and strengthened to the outlet shaft 122, and on the opposite end of the outlet shaft 122 can it be mounted a corresponding U-channel structure 120 without inlet shaft 121, so it also will be less resistance from axial forces, when the process is like in each U-channel structure 120. The fluid from outlet channels 112 from each of the U-channel structures will then go towards each other, on the inside-, or round the shaft 122 in the outlet channel 112, whereupon the fluid afterwards will be leaded radial outwards, between the U-channels structures, and further to utilization via own-, or one common channel or pipe. The bearings suspension can be on the shaft 122 with least 2 bearings, which each is placed as near as possible each U-channel structure. And/or at the both inlets openings 103, can it be arranged a slide-conic-bearings, where it can be of a gas pressure type. The slide bearings at each inlet can at the end be mounted to the end of an anchored pipe/channel, that will be inlet channel 103 which not rotates, and it can be adjustable axially, at on adjustable unit which it is mounted to. This is for an optimum suspended bearing in both of the inlet, and for proper axially placing of the rotary device into said spiral diffusers inlet walls, where it can be little axially margin. At the end of this said inlet channels 103 can the channel/pipe at each inlet, be formed in the same conic shape as the bearings which is mounted on the outside, or the shape is more convergence, and there where it is most narrow inside the inlet channel 103 is the beginning on the rotations device, and where it is a smooth passage forward to the beginning at the sink channels, which also can be divergence from the narrow passage in inlet channel 103 and to the top (near rotation centre) of the sink channel structures 104. Then can supersonic velocity be attainable, before sink channels 104, which is favorable for a highest possible static like pressure, when the fluid retards to a normal flow through velocity in the U-channels, which can be relative low in conditions to in-/out flow velocity and the periphery velocity for the fluid. The rotation can be run by the outlet fluid, and when it will be pressed out round the shaft 122, can it from rise channel 107 nearest shaft, be inside, or after the pass through channel from rise channel 107 to outlet channel 112 be adapted static-, or movable turbine like blades mounted to shaft or U-channel structures outlet side-wall. In this case, must the shaft be connected with the channel-partition-wall 109. But to get back the most of the tangential-acceleration-force for the fluid in sink channel 104, with the tangential-retardation-force up rise channel 107 will it therefore be more favorable to let outlet channel 112 be as near the centre of the shaft as possible, and outlet channel can be like as shown in FIG. 1. The blades in regulations valve 110 can stop further rotation of fluid after the shovel 123 towards the centre of shaft; and further can the regulations valve 110 set its blades in a adapted direction, to get completely or partly rotation force in addition when fluid pass through. When the fluid is pressed further radial from outlet shaft 112, from the U-channels structures 120 from each end of the shaft, can the radial outlet look like a shovel-turbine, with or without shovel-disks, which is mounted in or on the outlet shaft 122, with backwards bended shovels in the rotation direction, they can be adjustable, and can then at the same time also act as pressure regulation valve 110. The shovels can be adapted to give completely or partly rotation force and the fluid can afterwards be pressed outward in to a spiral-difusor which have adapted direction and is fastened to the evacuated housing_ Tightening between spiral difusor and shaft can be with labyrinth-tightening and when the said shovels/shovel-disk from outlet shaft is adapted to the spiral diffusers opening at right clearance, will it be a under pressure there and to the labyrinth tightening round the shaft, when the fluid has high velocity from turbine through the difusor-circular-split-opening at the spiral difusor, and can also make under pressure inside the evacuated housing, when it is moderate tightening between the shafts and difusor. The shovel turbine can be a commons, or one from each U-channel structures from each side, and in any case must the fluid from each side be hold away from each other by a partition wall, with a conic like tip towards moving direction for the fluid inside the outlet channels 112 and before the shovels turbines inlet. The shovel turbine is essential smaller radius in conditions to the U-channel structure. The evacuated housing can in this case be fastened and tightened between the inlet channels said adjusting unit at each side, in addition is the evacuated housing fastened to said spiral difusor and is also noise-, shock absorbed and anchored.

At said suspended bearings can it in said glide bearings at said inlet without shaft, be installed on the outside of inlet channel a lines of labyrinth tightening, where it from the utmost labyrinth circles are a channel that leads to the inlets sides under-pressure side (after narrowing), and when the glide-/cool medium, which can be the current fluid either direct from the inlet or in a own channel, where the fluid will be pressed inside between the bearings-area in adapted amount and pressure, which afterwards will pass the labyrinths circles where the pressure will diminish after them, and the fluid will afterwards be leaded in said channels to the inlets under-pressures side. Similar can be done at all rotating contact areas in the device, where it is suitable and may be with actual fluid-/cool medium which is passing at said contact-/tight area.

Inlet channels can also be arranged on each side of one disk structure (not shown). Where inlet can be around the shaft ends, or without shaft ends. And instead with conic bearings as said on each side of the disk structure. The inlet channels is connect and branching outwards to each sink channel from each inlet side, and gathers in a common rise channel structure from periphery, where the rise channel structure will be between the two sink channel structures from periphery and to centre of the disk structure, there the rise channel is structure will branching together to each outlet cannel in each shaft ends, or the outlet is only in one of the shaft ends. Instead of shaft ends, can it at the same place be an outlet channels/pipes and with shape of diffuser which not rotate, and is in contact with the disc structure at a similar way as said for inlet channels/pipes, but outlet opening have a small circular edge as outlet channel/pipe surrounds with small clearance, in such a way that when the fluid pass at high velocity it will create a under-pressure at the outside of said circular-formed-edge. And if it is a little leakage there, will it be a minor problem. Because the fluid in inlet will take the leakage with outwards sink channels to periphery and inwards in rise channels and out. When it is only one outlet channel at one side, can it on the other side be a similar channel for supply of other substances. Where the supply channels can be more than one and is arranged with pipes in same number as channels, where the innermost pipe is inside next pipe and so on for more pipes, and in the innermost pipe and the interval between the pipes, form the current supply channels, which is coupled further to the respectively channels in the rotation device. If outlet channels is leaded out at both sides, can said innermost pipe be outlet channel, and the interval on outside to next pipe can be inlet channel for cooling medium at one side of the rotation device, and on the other side at similar place is outlet channel for cooling medium. The cool channel pipe can further be surrounded by more pipes for inlet-/outlet channels for more substances as propellant and fluid. Or propellant is adapted mixed with fluid at inlet. Ignition by spark plug can be done as said at outlet, or with said shock pressure from inlet which pressure-ignite as said at periphery, and the sink channel structures on both side of the rise channel structures will cool it down.

Instead of glide bearings at said inlets, can it instead be mounted super conductive magnets (not shown) at a propitious way, and electric connected and controlled, in such a way that it can run the rotation and be suspended bearings at the same time. Cooling down for super conductive, can be done, or combined with said fluid, if it before said narrowing in inlet channel is cooled down, which after narrowing in inlet can have very low temperature, which dependent on gas type which then the fluid will be. Or it can with addition, or only be used cooled helium for this purpose, and it can be cooled again through the U-channel structure in own channels, and before expansion at outlet, the helium have to be cooled down so condensing achieves after expanding at outlet. All the disc structure can be surrounded by super conductive magnets, and with space to the said in-/outlet channels/nozzles, and the magnets can execute suspended bearings, rotation, balancing and can at the same time counteract radial and axially forces which act on the disc structure when it rotates and from the processes inside it. Said magnets can also be fits to execute an induction heating towards the periphery at the rotary unit, or this can be executed with a magnetron. The U-channel structure can also at periphery in a adapted area be of a no inductive material, and when the structure-, fluid and other substances inside the channels is completely or partly induction able, can they be heated up directly from the inductions magnets and/or the magnetron.

The shovels 123 at inlet 103 can be axially outwards and adapted forward-bended in rotation direction in inlet. At outlet 112 can the shovels also be axially outwards, but backwards-bended in rotation direction. It can be least 2 shovels which form a U-channel structure, from nearest possible centre of inlet, via periphery to nearest possible centre of outlet. And it can between them be placed in balance and symmetrical, more and shorter U-channels with various lengths from periphery, there all U-channels have same radial distance. So they are in same circle at periphery. Out at periphery can all the shovels have adapted hole, or channel between U-channels with same substances/fluid, so the substances/fluid in the channels will be even between they in the respectively circular-channels, which then will be formed for each substances/fluid at periphery, which also can lead to said outlet nozzles/valves at periphery.

Inlet channels for propellant 102, cooling medium 408 and possibly more channels for supply of more and other substances (not shown}, can be leaded from a radial slip chamber which bear against and tight-fitted on outlet shaft 122, or inlet shaft 121 which each is connected in channels into theirs respectively sink channels. In the slip chambers for each substance, is it inside radial turbines fastened to shaft and connected to said channels where the shovels, which can be regulate able from open to closed, and is forward-bended in rotation direction and will with that achieve a pump effect, in such a way that its also will form a under pressure inside the slip chamber which also give less pressure and leakage between tightening at shaft. When the shovels are regulate able and at closed position, can it at the same time be a valve that will close for supply of substances to the current slip chambers. Least one of the supplied substances, that is supplied to the rotation device, can also be combined to be a glide-/cooling-medium for said bearings/tight-fitting on the rotating device, and then the said glide-/cooling-medium also be adapted pressurized before the bearings, and after that the glide-/cooling-medium will be leaded inside the rotating device for further use. Or an own glide-/cooling-medium will be used to that purpose in own channels to and from said bearings/tight-fitting on the rotating device.

The U-channel structure is so far explained and shown in the figures as if the sink- and rise Channels are in 90° on the rotation axis, but they can be mounted with strengthening in a smaller angle as said (stretched more longitudinally axially), for sink- and rise channel structure, or for one of the channel structure. The angle between sink channel structure and rise channel structure will then be larger at periphery.

The rotating device may also be self-balancing with different systems, and one may be: Two circular round pipes/channels, which each are fitted inside or outside the U-channels structures, outside at respectively inlet- and outlet side, in an adapted circle between rotation axis and periphery, where the pipes/channels is centered on rotations axis. The balancing pipes/channels may be half-filled with a adapted fluid, or half-filled with balancing-balls which can be similar as ball race balls, with less dimension that the cross section of the balance channels. With constant rotation will the balls be spreads in the balance channel, and gradually be placed and will stop in the channel at optimum balance. When unbalance, vibration or similar at rotation will the balancing balls be sets in motion and then it will completely or partly stop said unbalance, vibration or similar in all axis when the balance channels are placed at each side of the U-channel structure, an when it is on condition that the present invention is in the first place at balance in all axis round the rotation axis.

More U-channel structures can be connected together in a serial link either on same shaft, or only with channels, so the outlets products from one U-channel structure will be pressurized to next U-channel structure and so on. It may also be one or more heat exchangers in the serial link. Said return circulation of fluid and cool medium can be done between one or more link in the serial link, or between the end- and the beginning of the serial link.

So far is the U-channels structure explained with closed channels, but it can also be open at periphery (not shown), or the utmost part of the U-channel structure 120 form a disk-like chamber that not rotate and is not fastened to the shovels 123 which rotate and is distributed and fastened to each sink channel structure 104 and rise channel structure 107, which further is fastened to the channel partition disk 109 with shaft 121, 122 and suspended bearings on stator blade which is fastened to the outer most part of the prevailing and static disk-like chamber with a U-channel structure inside, and with inlet 103 and outlet 112 around shaft ends 121, 122, or with other bearings-system as said earlier. Those prevailing inlet shovel wheel 104 and outlet shovel wheel 107 which is fastened to each other, can be formed as said earlier, also outlet regulation valve 110. On the outside of periphery on the static part of the U-channel structure can least one combustions chamber with a tangentially supply channel for supply of some of the fluid from sink channel structure 104 at adapted amount, and outlet channel from combustion chamber to periphery of rise channel 107, where combustion outlet channel can be adapted formed with a increased cross section area towards periphery, so the fluid will accelerate to periphery of rise channel structure 107, and some of the supplied fluid to combustion chamber can surround combustion chamber and its outlet channel in an own channel into periphery of sink channel. Combustion chamber includes propellant nozzle with supply channel for propellant, and ignitions mechanism for combustion of propellant. This U-channel structure device with a static outer housing will involve more friction and turbulence. But the shovel wheel can have higher rotation velocity which can give higher pressure towards periphery, which can compensate for friction and turbulence. With this shape it will be a condition for continuous and a minimum of flow through, to avoid overheating from friction/turbulence even without combustion. Heating can partly be done by said friction at periphery, which will form more expansion in rise channels when the fluid flows through the present invention. Heat exchange channels can be established as a U-channel structure inside the channel partition disk 109 with inlet/outlet as said earlier, and from the heat exchange sink-/rise channel can it be more axially channels with U-form inside the shovels.

The present invention can also be a heat- or cooling pump when the fluid is gas at outlet, where the pressurized gas will be leaded via a heat exchanger, which remove heat from the gas, which previously will expand through a turbine or similar, so the gas can be much colder then the surroundings, where the coldness can be utilized. Similarly it can before inlet when the fluid is compressed, also be utilized heat from there via a heat exchanger.

At periphery of the device, can the fluid/substances expand in many more method as said combustion. As where expansion is a result from heat and/or other chemicals, catalyzers, electrochemical reaction or other energy supply is a part of a productions process. Then this productions devices can be arranged at periphery where said reactions are executed inside a disk-like chamber which surround rotation axis, and fluid/substances leads in to the disk-like reaction chamber at its periphery, and pressurized fluid/substances from there will be leaded in channels to outlet from the innermost side towards rotation axis of said reaction chamber, and the pressurized fluid/substances energy utilized further from outlet channel. This current rotation-production-unit can in addition include solutions as said earlier.

The inventive device may also be a pump for liquid substance and it can with that also be for instance a steam-high-pressure-pump, where for instance water heats from periphery and upward rise channel, then will hot water/steam, which have lower density then cold water in sink channel, make unbalance between they so the water/steam will be high pressed out for utilizing.

Said rotations devices can be denominates as: Centrifugal-force-Difference Energy (CDE) devices The inventive device has to be produced of material with the necessary strength to resist the forces which will arise at high rotation. The structure must have high strength in relation to its density to restrict said forces. The structure can be formed in metal, or from ceramic or composite materials, or nanotechnology materials, or a combination of these. The centrifugal force determines the rotation velocity and the diameter of the 1J-channel structure, which is adapted to the force which is tolerated for the used material.

The figures must be seen as schematic drawings illustrating the principles of the invention only, and not necessarily showing real world physical realizations of the invention. The invention may be realized using many different materials and arrangements of its components. Such realizations should be within the abilities of any person skilled in the art.

The invention claimed is:

1. A rotating device for producing a pressure of a fluid by expansion, comprising: a U-channel structure (120) extending radially from an axis of rotation of a shaft (121, 122), wherein the rotating device is fitted within an anchored housing (413) with bearings rotatably coupling the shaft (121, 122) to the housing (413), and wherein the U-channel structure includes an expansion point (105) arranged at a periphery of the rotating device, a sink channel (104) for supplying a pressurized fluid to said expansion point (105), a propellant channel that follows a contour of the sink channel and provides a propellant fluid to the expansion point, and a rise channel (107) for supplying an expanded fluid from said expansion point (105) through an outlet channel (112) to a regulation valve (110) to supply said expanded fluid at a higher pressure than that of the pressurized fluid to an energy utilization device, and wherein the sink channel and the rise channel are connected to one another at the expansion point where the pressurized fluid is mixed with the propellant fluid.

2. The rotating device as claimed in claim 1, further comprising a first inlet channel (103) in the shaft (121, 122), wherein the first inlet channel (103) is connected with the sink channel (104) which leads to the expansion point (105), and said first inlet channel (103) supplying the pressurized fluid to the expansion point (105) through the sink channel (104).

3. The rotating device as claimed in claim 2, said rotating device further comprising at least one heat exchanger for transferring heat from fluid before the first inlet channel (103) or before the energy utilizations device.

4. The rotating device as claimed in claim 1, further comprising a first inlet channel (103) in the shaft (121, 122), wherein the first inlet channel (103) branches out into an additional sink channel that goes from the shaft in a radially opposite direction to that of the sink channel (104) to an additional expansion point at the periphery, and said additional sink channel supplying the pressurized fluid to said additional expansion point.

5. The rotating device as claimed in claim 4, said rotating device further comprising an additional rise channel connected to the additional sink channel in the periphery at said additional expansion point, and the additional rise channel is adapted to remove expanded fluid from the additional expansion point, and the additional rise channel is branched in to the outlet channel (112) in the shaft (122) that leads to the regulation valve (110) adapted to control the higher pressure and a flow of the expanded fluid.

6. The rotating device as claimed in claim 5, said rotating device further comprising one or more catalysts in the from the rise channel (107) to a condenser.

7. The rotating device as claimed in claim 6, said rotating device further comprising a succession of catalysts, containing at least chrome-iron-oxide, nickel, copper and zinc materials.

8. The rotating device as claimed in claim 4, wherein the first inlet channel (103) that surrounding inlet shaft (121) and is suspended in bearings on a stator blade that is fastened to the inlet channel (103), and the first inlet channel is further connected via the U-channel structure to a first outlet channel (112), which surrounding outlet shaft (122) that is suspended in bearings on regulate able stator blade which also is regulation valve (110) being fastened to inside of outlet channel (112).

9. The rotating device as claimed in claim 1, wherein said sink channel is adapted to be radial bend completely or partly backwards to a rotation direction of the rotating device.

10. The rotating device as claimed in claim 1, said rotating device further comprising a second inlet channel (102) connected to the propellant channel that is arranged to supply the propellant fluid to the expansion point (105) through a propellant nozzle (106) at the periphery.

11. The rotating device as claimed in claim 10, said rotating device further comprising a spark plug (111) adapted to operate with a DC voltage to produce an arc to combust the propellant fluid from the propellant nozzle (106), wherein the spark plug (111) is arranged after the propellant nozzle (106) in a flow direction of the pressurized fluid, and in area connecting the rise channel (107) and the outlet channel (112).

12. The rotating device as claimed in claim 11, said rotating device is configured to adapt the pressure of the pressurized fluid to a spontaneous combustion at the expansion point (105) of the propellant fluid from the propellant nozzle (106) when the pressurized fluid is at a compressible phase.

13. The rotating device as claimed in claim 1, said rotating device further comprising a heat exchange channel (108) that surrounds channels (103, 104, 107, 112), adapted to cool the rotating device, and the heat exchange channel is arranged with longitudinal perforated heat exchange walls, and the heat exchange channel is connected with a turbine (418) adapted to control a pressure of a flow through of a cooling medium.

14. The rotating device as claimed in claim 13, said rotating device further comprising a pump/compressor adapted to pressurize the pressurized fluid and the cooling medium before they are supplied to the rotating device.

15. The rotating device as claimed in claim 13, wherein the rise channel (407) is connected together with a heat exchange rise channel (424) in an adapted point between them.

16. The rotating device as claimed in claim 1, said rotating device further comprising supplying energy to the expansion point (105) for expansion of the pressurized fluid to the rise channel (107).

17. The rotating device as claimed in claim 1, said rotating device further comprising at least one propellant nozzle (106) for delivering the propellant fluid, wherein said propellant nozzle (106) is arranged before a spark plug (111) in a flow direction of the pressurized fluid, and in an area connecting the sink channel (104) and the rise channel (107).

18. The rotating device as claimed in claim 1, said rotating device further comprising one combustion channel arranged in a circle along a periphery of the rise channel (107) and fastened to a plurality of shovels (223) and a number of radial plates for heat exchanging.

19. The rotating device as claimed in claim 1, wherein said anchored housing is arranged with bearing and tightening towards the shaft for said U-channel structure.

20. The rotating device as claimed in claim 1, wherein the energy utilizations device is adapted to optimize the flow through, so that the regulation valve (110) configured to achieve and optimize the higher pressure of the expanded fluid flowing out of the rotating device is less necessary.

21. The rotating device as claimed in claim 1, said rotating device further comprising a recycling channel connecting the outlet channel (112) via a heat exchanger and condenser to an injector nozzle that is coupled to the first inlet channel (103), wherein the recycling channel is configured to pull more fluid into the inlet channel.

22. The rotating device as claimed in claim 21, said rotating device further comprising a recirculation channel that is connected to a turbo charger for supplying to the first inlet channel (103) an additional fluid that is pressurized and cooled down via the heat exchanger before said inlet channel (103).

23. The rotating device as claimed in claim 21, wherein said condenser located outside of the U-channel structure (120) does not rotate and is not fastened to the shovels (123) that rotate.

24. The rotating device as claimed in claim 1, said rotating device is configured to include at least one additional U-channel structure that is linked in a serial arrangement to the U-channel structure.

25. The rotating device as claimed in claim 1, said rotating device including shovels (123) located near inlet (103), stretched axially outwardly, and forwardly bended in a rotation direction of the rotating device, wherein shovels (123) are connected via the U-channel structure to the outlet channel (112), and wherein the shovels are stretched axially outwardly in the outlet channel (112), are bent backwards in the rotation direction to give an adapted push force to the rotation of the rotating device, and at start-up add an accumulated pressurized fluid into the inlet channel to start the rotation.

26. The rotating device as claimed in claim 1, said rotating device further comprising an adapted additional outlet channel at the periphery of the U-channel structure, wherein the additional outlet channel is connected to one of the heat exchange channel, the sink channel, and the rise channel in order to remove sediment substances outward at periphery, which will be cached in an included spiral diffuser that's enclosed along the periphery of the U-channel structure.

* * * * *